United States Patent [19]

Hoek et al.

[11] Patent Number: 4,857,170

[45] Date of Patent: Aug. 15, 1989

[54] HYDROCARBON CONVERSION CATALYSTS

[75] Inventors: Arend Hoek; Tom Huizinga; Ian E. Maxwell, all of Amsterdam, Netherlands

[73] Assignee: Shell Oil Company, Houston, Tex.

[21] Appl. No.: 55,652

[22] Filed: May 29, 1987

[30] Foreign Application Priority Data

May 30, 1986 [GB] United Kingdom ................ 8613132

[51] Int. Cl.$^4$ ............................................. C10G 47/12
[52] U.S. Cl. ............................... 208/111; 208/216 PP; 502/79
[58] Field of Search ........................... 208/111; 502/79

[56] References Cited

U.S. PATENT DOCUMENTS

| | | | |
|---|---|---|---|
| 3,130,007 | 4/1964 | Breck | 502/79 |
| 3,536,605 | 10/1970 | Kittrell | 208/59 |
| 3,929,672 | 12/1975 | Ward | 502/66 |
| 3,945,943 | 3/1976 | Ward | 502/66 |
| 4,097,365 | 6/1978 | Ward | 208/111 |
| 4,255,251 | 3/1981 | Durkin | 208/108 |
| 4,277,373 | 7/1981 | Sawyer et al. | 208/111 |
| 4,415,438 | 11/1983 | Dean et al. | 502/79 |
| 4,419,271 | 12/1983 | Ward | 502/65 |
| 4,429,053 | 1/1984 | Ward | 502/73 |
| 4,500,645 | 2/1985 | Fuchikami et al. | 502/65 |
| 4,517,073 | 5/1985 | Ward et al. | 208/111 |
| 4,517,074 | 5/1985 | Ward | 208/216 R |
| 4,563,434 | 1/1986 | Ward et al. | 502/79 |
| 4,565,621 | 1/1986 | Ward | 208/111 |
| 4,576,711 | 3/1986 | Ward et al. | 208/111 MC |
| 4,600,498 | 7/1986 | Ward | 208/254 H |
| 4,610,973 | 9/1986 | Ward | 502/65 |
| 4,648,958 | 3/1987 | Ward | 208/110 |
| 4,661,239 | 4/1987 | Steigieder | 208/111 |
| 4,664,776 | 5/1987 | Ward | 502/527 |
| 4,668,649 | 5/1987 | Yoshida et al. | 502/79 |
| 4,686,030 | 8/1987 | Ward | 208/111 |
| 4,711,770 | 12/1987 | Skeels et al. | 423/328 |
| 4,738,940 | 4/1988 | Dufresne et al. | 502/66 |
| 4,743,354 | 5/1988 | Ward | 208/111 |
| 4,743,355 | 5/1988 | Ward | 208/111 |
| 4,762,608 | 8/1988 | Oidchenko et al. | 208/131 |
| 4,786,403 | 11/1988 | Kemp | 208/216 PP |

FOREIGN PATENT DOCUMENTS

| | | |
|---|---|---|
| 0028938 | 5/1981 | European Pat. Off. ............ 208/111 |
| 0162733 | 10/1985 | European Pat. Off. . |
| 2561946 | 11/1985 | France . |
| 2014970 | 9/1979 | United Kingdom ................ 208/111 |
| 2114594 | 8/1983 | United Kingdom ................ 208/111 |

OTHER PUBLICATIONS

Catalyst Base Lz-Y20 Powder, Union Carbide Molecular Sieves.

*Primary Examiner*—Anthony McFarlane

[57] ABSTRACT

Composition of matter suitable as a catalyst (base) in hydroprocessing comprising a crystalline aluminosilicate zeolite and a binder wherein the crystalline aluminosilicate comprises a modified Y zeolite having a unit cell size below 24.35 Å, a degree of crystallinity which is at least retained at increasing $SiO_2/Al_2O_3$ molar ratios, a water adsorption capacity (at 25° C. and a $p/p_o$ value of 0.2) of at least 8% by weight of modified zeolite and a pore volume of at least 0.25 ml/g wherein between 10% and 60% of the total pore volume is made up of pores having a diameter of at least 8 nm. The invention also relates to hydroconversion catalysts and processes based on said compositions of matter.

15 Claims, No Drawings

HYDROCARBON CONVERSION CATALYSTS

FIELD OF THE INVENTION

The present invention relates to hydrocarbon conversion processes and catalysts which can be used in such processes. The present invention also relates to compositions of matter suitable as catalyst or catalyst base in hydroprocessing, particularly in hydrocracking.

BACKGROUND OF THE INVENTION

Of the many hydroconversion processes known in the art, hydrocracking is becoming increasingly important since it offers product flexibility together with product quality. As it is also possible to subject rather heavy feedstocks to hydrocracking it will be clear that much attention has been devoted to the development of hydrocracking catalysts.

Modern hydrocracking catalysts are generally based on zeolitic materials which may have been adapted by techniques like ammonium ion exchange and various forms of calcination in order to improve the performance of the hydrocracking catalysts based on such zeolites.

One of the zeolites which is considered to be a good starting material for the manufacture of hydrocracking catalysts is the well-known synthetic zeolite Y as described in U.S. Pat. No. 3,130,007 issued Apr. 21, 1964. A number of modifications has been reported for this material which include, inter alia, ultrastable Y U.S. Pat. No. 3,536,605 issued Oct. 27, 1970) and ultrahydrophobic Y (U.K Patent Application GB-A-No. 2,014,970, published Sept. 5, 1979). In general, it can be said that the modifications cause a reduction in the unit cell size depending on the treatment carried out.

The ultrahydrophobic Y zeolites as described in GB-A-No. 2,014,970 are also referred to in European Patent Application EP-B-No. 28,938 published May 20, 1981, and European Patent Specification EP-B-No. 70,724 published Feb. 5, 1986 as suitable components for hydrocracking catalysts. From said publications it appears that such zeolites have an intrinsically low water adsorption capacity. Water adsorption capacities below 5% (EP-B-No. 28,938), respectively 8% (EP-B-No. 70,824) by weight by zeolite are considered to be the maximum levels acceptable and it is confirmed experimentally in EP-B-No. 28,938 that a water adsorption capacity of 8.5% by weight on zeolite causes a drastic decrease in selectivity.

In European Patent Application EP-A-No. 162,733 published Nov. 11, 1985, zeolite Y components for hydrocracking catalysts are described which must possess a rather stringent pore diameter distribution which in essence means that at least 80% of the total pore volume is made up of pores having a diameter of less than 2 nm, and preferably at least 85% of the total pore volume is made up of pores having a diameter of less than 2 nm.

In U.K Patent Application GB-A-No. 2,114,594 published Aug. 24, 1983, a process for the production of middle distillates is disclosed wherein use is made of catalysts comprising so-called expanded pore faujasitic zeolites. The pore expansion referred to in said patent specification has been obtained by firstly steaming the faujasitic zeolite at a temperature of at least 538° C., in particular at a temperature above 760° C., followed by contacting the steamed faujasitic zeolite with an acid, preferably an acid having a pH less than 2. It should be noted that the degree of crystallinity retained in the expanded pore zeolite dramatically decreases at incrasing amounts of acid used (see FIG. 3 of GB-A-No. 2,114,594). Since the $SiO_2/Al_2O_3$ molar ratio substantially increases linearly with the amounts of acid use (see FIG. 2) it appears that the crystallinity of the faujasitic zeolites treated according to the process described in GB-A-No. 2,114,594 intrinsically decreases at increasing $SiO_2/Al_2O_3$ molar ratios.

It has now been found that the use of certain modified Y zeolites as components in hydrocracking catalysts gives an unexpected high selectivity to the desired product(s) combined with a significantly lower gas make than experienced thus far with catalysts based on Y zeolite. Moreover, it was found that the quality of the product(s) was improved despite a lower hydrogen consumption. These improvements are even more remarkable since they can be achieved with catalysts showing a higher activity than thus far achievable with Y type zeolites.

SUMMARY OF THE INVENTION

The present invention relates to compositions of matter suitable as a catalyst (base) in hydroprocessing comprising a crystalline aluminosilicate zeolite and a binder wherein the crystalline aluminosilicate comprises a modified Y zeolite having a unit cell size below 24.35 A, a degree of crystallinity which is at least retained at increasing $SiO_2/Al_2O_3$ molar ratios, a water adsorption capacity (at 25° C. and a $p/p_o$ value of 0.2) of at least 8% by weight of modified zeolite and a pore volume of at least 0.25 ml/g wherein between 10% and 60% of the total pore volume is made up of pores having a diameter of at least 8 nm.

DESCRIPTION OF THE PREFERRED EMBODIMENTS

Preference is given to compositions of matter wherein between 10% and 40% of the total pore volume of the modified Y zeolite is made up of pores having a diameter of at least 8 nm. The pore diameter distribution is determined by the method described by E.P. Barrett, G. Joyner and P.P. Halenda (J. Am. Chem. Soc. 73, 373 (1951)) and is based on the numerical analysis of the nitrogen desorption isotherm. It should be noted that inter-crystalline voids are excluded in the determination of the percentage of the total pore volume made up in pores having a diameter of at least 8 nm when said percentage is between 10% and 40%.

It has been found that very good results in terms of performance and activity can be obtained when modified Y zeolites are used having a water adsorption capacity of at least 10% by weight on zeolite, in particular between 10% and 15% by weight of zeolite. The water adsorption capacity of the modified Y zeolites present in the compositions of matter and/or the catalysts according to the present invention is measured at 25° C. and a $p/p_o$ value of 0.2. In order to determine the water adsorption capacity the modified Y zeolite is evacuated at elevated temperature, suitably 400° C., and subsequently subjected at 25° C. to a water pressure in the apparatus and the saturation pressure of water at 25° C.).

The unit cell size of the modified Y zeolites present in the compositions of matter is below 24.35 Å (as determiend by ASTM-D-3492, the zeolite being present in its $NH_4^+$-form). It should be noted that the unit cell size is but one of the parameters which determine the suitability of modified Y zeolites. It has been found that also the water adsorption capacity and the pore diameter distribution as well as the crystallinity have to be taken into account in order to be able to obtain marked improvements in performance as referred to hereinbefore.

As regards crystallinity it should be noted that the modified Y zeolites according to the present invention should at least retain their crystallinity (relative to a certain standard, e.g., Na-Y) when comparing crystallinity as a function of increasing $SiO_2/Al_2O_3$ molar ratio. Generally, the crystallinity will slightly improve when comparing modified Y zeolites with increasing $SiO_2/Al_2O_3$ molar ratios.

The compositions of matter according to the present invention suitably comprise 5-90% by weight of modified Y zeolite and 10-95% by weight of binder. Preferably the compositions of matter comprise rather high amounts of modified Y zeolite: 50-85% by weight of modified Y zeolite and 15-50% by weight of binder being particularly preferred.

The binder(s) present in the composition(s) of matter suitably comprise inorganic oxides or mixtures of inorganic oxides. Both amorphous and crystalline binders can be applied. Examples of suitable binders comprise silica, alumina, silica-alumina, clays, zirconia, silica-zirconia and silica-boria. Preference is given to the use of alumina as binder.

Depending on the desired unit cell size the $SiO_2/Al_2O_3$ molar ratio of the modified Y zeolite will have to be adjusted. There are many techniques described in the art which can be applied to adjust the unit cell size accordingly. It has been found that modified Y zeolites having a $SiO_2Al_2O_3$ molar ratio between 4 and 25 can be suitably applied as the zeolitic component of the compositions of matter according to the present invention. Preference is given to modified Y zeolites having a molar $SiO_2/Al_2O_3$ ratio between 8 and 15.

The present invention further relates to catalyst compositions comprising besides a binder and modified Y zeolite as defined hereinbefore at least one hydrogenation component of a Group VI metal and/or at least one hydrogenation component of a Group VIII metal. Suitably, the catalyst compositions according to the present invention comprise one or more components of nickel and/or cobalt and one or more components of molybdenum and/or tungsten or one or more components of platinum and/or palladium.

The amount(s) of hydrogenation component(s) in the catalyst compositions suitably range between 0.05 and 10% by weight of Group VIII metal component(s) and between 2 and 40% by weight of Group VI metal component(s), calculated as metal(s) per 100 parts by weight of total catalyst. The hydrogenation components in the catalyst compositions may be in the oxidic and/or the sulphidic form. If a combination of at least a Group VI and a Group VIII metal component is present as (mixed) oxides, it will be subjected to a sulphiding treatment prior to proper use in hydrocracking.

The present invention also relates to a process for converting hydrocarbon oils into products of lower average molecular weight and lower average boiling point wherein a hydrocarbon oil is contacted at elevated temperature and pressure in the presence of hydrogen with a catalyst comprising a modified Y zeolite having a unit cell size below 24.35 Å, a water adsorption capacity (at 25° C. and a $p/p_o$ value of 0.2) of at least 8% by weight of modified zeolite and a pore volume of at least 0.25 ml/g wherein between 10% and 60% of the total pore volume is made up of pores having a dimater of at least 8 nm, a binder and at least one hydrogenation component of a Group VI metal and/or at least one hydrogenation component of a Group VIII metal.

Preferably, the hydroconversion process is carried out by using catalysts comprising a modified Y zeolite wherein between 10% and 40% of the total pore volume (excluding inter-crystalline voids) is made up of pores having a diameter of at least 8 nm. Good results have been obtained using modified Y zeolites in the catalyst compositions wherein the water adsorption capacity is at least 10% by weight of modified zeolite, and in particular between 10% and 15% by weight of modified zeolite.

Suitably, the process according to the present invention is carried out using a catalyst composition comprising 5-90% by weight of modified Y zeolite and 10-95% by weight of binder, and preferably 50-85% by weight of modified Y zeolite and 15-50% by weight of binder. Suitable binders comprise inorganic oxides or mixtures of inorganic oxides. Examples of binders comprise silica, alumina, silica-alumina, clay, silica-zirconia and silica-boria. Preference is given to the use of alumina as binder.

Modified Y zeolites having a $SiO_2/Al_2O_3$ molar ratio between 4 and 15 and in particular between 8 and 15 can be suitably applied as the zeolitic components in the catalyst compositions to be used in the hydroconversion process according to the present invention.

Preferably, the process according to the present invention is carried out by using catalysts comprising, in addition to the zeolitic component and the binder, one or more components of nickel and/or cobalt and one or more components of molybdenum and/or tungsten or one or more components of platinum and/or palladium. In particular, use is made of hydrogenation components comprising between 0.05 and 10% by weight of nickel and between 2 and 40% by weight of tungsten, calculated as metals per 100 parts by weight of total catalyst. Preferably the hydrogenation components are used in sulphided form.

Hydroconversion process configurations in accordance with the present invention are those wherein a substantial reduction in average molecular weight and boiling point can be accomplished by contacting the feed with a catalyst composition comprising a modified Y zeolite as described hereinbefore and a binder.

Examples of such processes comprise single-stage hydrocracking, two-stage hydrocracking, series-flow hydrocracking as well as mild hydrocracking.

It will be appreciated that the hydroconversion processes in accordance with the present invention can also be carried out suitably in bunker-type operations, i.e., by using reactor vessels allowing for periodical or intermittent catalyst removal and replenishment. Use can be made of the various bunker-techniques described in the art.

Feedstocks which can be suitably applied in the process according to the present invention comprise gas oils, vacuum gas oils, deasphalted oils, long residues, catalytically cracked cycle oils, coker gas oils and other thermally cracked gas oils and syncrudes, optionally originating from tar sands, shale oils, residue upgrading processes or biomass. Combinations of various feedstocks can also be applied.

It may be desirable to subject part or all of the feedstock to one or more (hydro)treatment steps prior to its use in the hydrocarbon conversion process according to the present invention. It is often found convenient to subject the feedstocks are to be processed it will be advantageous to subject such feedstocks to a (hydro) demetallization treatment.

Suitable process conditions to be applied comprise temperatures in the range of from 250° C. to 500° C., pressures up to 300 bar and space velocities between 0.1 and 10 kg feed per liter of catalyst per hour (kg/l/h). Gas/feed ratios between 100 and 5000 Nl/kg feed (normal liters at standard temperature and pressure per kilogram) can suitably be used.

Preferably, the hydroconversion process according to the present invention is carried out at a temperature between 300° C. and 450° C., a pressure between 25 and 200 bar and a space velocity between 0.2 and 5 kg feed per liter of catalyst per hour. Preferably, gas/feed ratios between 250 and 2000 are applied.

The catalysts to be used in the hydrocarbon conversion process according to the present invention, and in particular in the hydrocracking process appear to be very flexible as they are capable of producing product fractions with rather narrow boiling point ranges because of their inherent property of limited overcracking. Therefore, they can be used advantageously in various modes of operation dependent on the desired product slate.

It is thus possible to use as feed a hydrocarbon oil fraction having a boiling point range slightly above the boiling point range of the product to be obtained in the process. However, substantially higher boiling feeds can also be used conveniently to produce materials of similar product boiling point range. For instance, a vacuum gas oil appears to be an excellent feedstock to produce middle distillates using the catalysts in accordance with the present invention but also naphtha can be produced in high yields. By adjusting, for instance, the operating temperature and/or the recycle cut-point (when operating in recycle mode) either middle distillate or naphtha will become the main product while retaining high selectivity with respect to the desired product.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The present invention will now be illustrated by means of the following examples which are provided for illustration and are not to be construed as limiting the invention.

EXAMPLE I (a) Preparation of modified Y zeolite/binder composition.

A commercially available ammonium-ultra stable zeolite Y having a unit cell size of 24.57 A, a sodium oxide content of 0.21%wt and a $SiO_2/Al_2O_3$ molar ratio of about 6 was subjected to an ion-exchange treatment with 0.2 M aluminum sulphate for one hour under reflux-conditions. Thereafter, the material thus treated was subjected to a calcination in the presence of steam for a period of one hour at 700° C. The calcined material obtained had a unit cell size of 24.30 Å and a $SiO_2/Al_2O_3$ molar ratio of 6.85.

The material obtained was then subjected to an ion-exchange treatment with 0.16 M aluminum sulphate for one hour under reflux conditions followed by a treatment with 1 M ammonium nitrate under the same conditions. This latter treatment was repeated once. The modified Y-zeolite obtained had a unit cell size of 24.33 Å and a $SiO_2/Al_2O_3$ molar ratio of 9.85.

466 Grams of said modified Y zeolite having a unit cell size of 24.33 Å, a $SiO_2/Al_2O_3$ molar ratio of 9,85, a water adsorption capacity (at 25° C. and a $p/p_o$ value of 0.2) of 11.3% by weight, a nitrogen pore volume of 0.40 ml/g wherein 18% of the total pore volume is made up of pores having a diameter >8 nm and a loss of ignition (550° C.) of 14.1% by weight is mixed with 135 g hydrated aluminum oxide (boehmite, ex Condea) with a loss on ignition of 25.8% by weight. Subsequently a solution of 5 g of acetic acid and 302.6 g of water was added to the powdery mixture. After mulling the mixture obtained it was extruded in a Bonnot extruder provided with a die plate producing 1.5 mm extrudates. The extrudates obtained were dried for 2 hours at 120° C. and finally calcined for 2 hours at 500° C. The extrudates obtained had a water pore volume of 0.66 ml/g.

(b) Preparation of catalyst composition

50 Grams of the extrudates as prepared according to the procedure described in Example I a were dried at 450° C. for 1 hour prior to impregnation with 33 ml of a solution which is made up of 25 g of a solution prepared by blending 214.3 g of a nickel nitrate solution (14% by weight of Ni), 150 g of water and 137 g of ammonium meta tungstate (69.5% by weight of W), and 8 g of water. The impregnated extrudes were homogenized for 1 hour using a rolling device. Finally the metal-containing extrudates were dried for 2 hours at 120° C. and calcined at 500° C. for 1 hour. The catalyst obtained contained 2.6% by weight of nickel and 8.2% by weight of tungsten. The ready catalyst contained 77.5% by weight of modified Y zeolite and 22.5% by weight of binder (based on total amount of zeolite and binder on a dry basis).

(c) Hydrocracking experiments.

The catalyst was described in Example I b was subjected to a hydrocracking performance test involving a low sulphur, low nitrogen vacuum gas oil having the following properties:

C (%wt) : 86.2
H (%wt) : 13.8
d (70/4) : 0.826
viscosity (100° C.) : 4.87 cS (ASTM-D-445)
viscosity (60° C.) : 12.43 cS (ASTM-D-445)
RCT (%wt) : 0.05 (ASTM-D-542)
I.B.P. : 205° C.
10/20 : 332/370
30/40 : 392/410
50/60 : 428/448
70/80 : 467/492
90 : 525
F.B.P. : 598

The catalyst was firstly subjected to a presulphiding treatment by slowly heating in a 10% v $H_2S/H_2$-atmosphere to a temperature of 370° C. The catalyst was tested in a 1:1 dilution with 0.2 mm SiC particles under the following operating conditions: WHSV 1.1 kg.l$^{-1}$.h$^{-1}$, $H_2S$ partial pressure 1.4 bar, total pressure 130 bar and a gas/feed ratio of 1,000 Nlkg$^{-1}$. The experiment was carried out in once-through operation.

When operating the hydrocracking in the kerosene mode of operation, the catalyst performance is expressed at 70% by weight conversion of 300° C.+ boiling point material in the feed after allowing the catalyst to stabilize.

The following results were obtained:
Temperature required (70% conv. 300° C.+): 318° C.
Distribution of 300° C.−product (in a % by weight):
$C_1-C_4$ : 7
$C_5$–130° C.: 46
130° C.–300° C. : 47

The chemical hydrogen consumption amount to 1.2% by weight.

EXAMPLE II

The hydrocracking experiment as described in Example I c was repeated in the naphtha mode of operation, i.e., the catalyst as described in example I b was subjected to the presulphiding, the feedstock and operating conditions as described in example I c but in this case the performance is expressed at 70% by weight conversion of 180° C.+ boiling point material in the feed.

The following results were obained:
Temperature required (70% conv. of 180° C.+): 321° C.
Distribution of 180° C.− product (in % by weight):
$C_1-C_4$ : 11
$C_5$–65° C.:21
65° C.–180° C.:68

The chemical hydrogen consumption amounted to 1.3% by weight.

COMPARATIVE EXAMPLE

A commercially available ultra-stable Y zeolite having a unit cell size of 24.56 Å, a water adsorption capacity of 24% by weight (at 25° C. and a $p/p_o$ value of 0.2) and a nitrogen pore volume of 0.38 ml/g wherein 8% of the total pore volume is made up of pores having a diameter of >8 nm was treated with hydrated aluminum oxide and a solution of nickel nitrate and ammonium metatungstate so as to obtain a catalyst containing 2.6% by weight of nickel and 8.2% by weight of tungsten.

The comparative catalyst was subjected to a presulphiding treatment was described in Example Ic and subjected to the same feed. When operating in kerosene mode (i.e. expressing catalyst performance at 70% by weight conversion of 300° C.+ boiling point material in the feed) after allowing the catalyst to stabilize, the following results were obtained:
Temperature requirement (70% conv. of 300° C.+): 325° C.
Distribution of 300° C.− product (in % by weight):
$C_1-C_4$ : 13
$C_5$–130° C.:57
130° C.–300° C.:30

The chemical hydrogen consumption amounted to 1.5% by weight.

The comparative catalyst was also subjected to an experiment as described in example II, i.e., in the naphtha mode of operation.

The following results were obtained:
Temperature requirement 325° C.
Distribution of 180° C.− product (in % by weight):
$C_1-C_4$ :16
$C_5$–65° C.:26
65° C.–180° C.:58

The chemical hydrogen consumption amounted to 1.5% by weight. It will be clear that the catalysts in accordance with the present invention are more active and selective than catalysts based on known ultra-stable Y zeolites. Also the chemical hydrogen consumption is slightly reduced.

We claim:

1. A process for hydrocracking hydrocarbon oils into products of lower average molecular weight and lower average boiling point comprising contacting a hydrocarbon oil at a temperature between 250° C. and 500° C. and a pressure up to 300 bar in the presence of hydrogen with a catalyst consisting esssentially of a Y zeolite modified to have a unit cell size below 24.35Å, a water adsorption capacity (at 25° C. and a $p/p_o$ value of 0.2) of at least 8% by weight of the zeolite and a pore volume of at least 0.25 ml/g wherein between 10% and 60% of the total pore volume is made up of pores having a diameter of at least 8 nm; an alumina binder and at least one hydrogenation component selected from the group consisting of a Group VI metal, a Group VIII metal and mixtures thereof.

2. The process according to claim 1 wherein in the zeolite between 10% and 40% of the total pore volume is made up of pores having a diameter of at least 8 nm.

3. The process according to claim 2, wherein the zeolite has a water adsorption capacity of at least 10% by weight of zeolite.

4. The process according to claim 3, wherein the zeolite has a water adsorption capacity between 10% and 15% by weight of modified zeolite.

5. The process according to claim 4, wherein the catalyst consists essentially of 5–90% by weight of zeolite and 10–95% by weight of alumina binder.

6. The process according to claim 5, wherein the catalyst consists essentially of 50–85% by weight of zeolite and 15–50% by weight of alumina binder.

7. The process according to claim 6 wherein the zeolite has a $SiO_2/Al_2O_3$ molar ratio from 4 to 25.

8. The process according to claim 7, wherein the zeolite has a $SiO_2/Al_2O_3$ molar ratio of from 8 to 15.

9. The process according to any one of claims 1–8, wherein the hydrogenation component comprises a component selected from the group consisting of nickel, cobalt and mixtures thereof and a component selected from the group consisting of molybdenum, tungsten and mixtures thereof.

10. The process according to any one of claims 1–8 wherein the hydrogenation component comprises a component selected from the group consisting of platinum, palladium and mixtures thereof.

11. The process according to claim 9, wherein use is made of a hydrogenation component comprising between 0.05 and 10% by weight of nickel and between 2 and 40% by weight of tungsten, calculated as metals per 100 parts by weight of total catalyst.

12. The process according to claim 22, wherein use is made of hydrogenation component(s) of Group VI in sulphided form.

13. The process according to claim 1 which is carried out at a temperature in the range of from 250° C. to 500° C., a pressure up to 300 bar and a space velocity between 0.1 and 10 kg feed per liter of catalyst per hour.

14. The process according to claim 13 which is carried out at a temperature between 300° C. and 450° C., a pressure between 25 and 200 bar and a space velocity between 0.2 and 5 kg feed per liter catalyst per hour.

15. A process for converting hydrocarbon oils into products of lower average molecular weight and lower average boiling point comprising contacting a hydrocarbon oil at a temperature between about 300° C. and about 450° C. and a pressure between about 25 and about 200 bar in the presence of hydrogen with a catalyst consisting essentially of about 50-85% by weight of a crystalline aluminosilicate zeolite wherein the crystalline aluminosilicate consists essentially of a Y zeolite modified to have a unit cell size below about 24.35 Å, a $SiO_2/Al_2O_3$ molar ratio between about 8 to about 15, a water adsorption capacity (at 25° C. and a $p/p_o$ value of 0.2) of between about 10-15% by weight of the zeolite and a pore volume of at least about 0.25 ml/g wherein between about 10 to about 40% of the total pore volume is made up of pores having a diameter of at least about 8 nm; about 15-50% by weight of a binder consisting essentially of alumina; from about 0.05 to about 10% by weight of nickel and from about 2 to about 40% by weight of tungsten calculated as metals per 100 parts of total catalyst.

* * * * *